United States Patent
Cattoz et al.

(10) Patent No.: US 11,059,924 B2
(45) Date of Patent: Jul. 13, 2021

(54) POLYMERS AND LUBRICATING COMPOSITIONS CONTAINING POLYMERS

(71) Applicant: Infineum International Limited, Abington (GB)

(72) Inventors: Beatrice Nicole Cattoz, Abington (GB); Anthony James Strong, Abington (GB); Daniel Phillips, Abington (GB); Andrew Schwarz, Abington (GB); Remzi Becer, London (GB); Valentin Beyer, London (GB)

(73) Assignee: Infineum International Limited

( * ) Notice: Subject to any disclaimer, the term of this patent is extended or adjusted under 35 U.S.C. 154(b) by 0 days.

(21) Appl. No.: 16/575,928

(22) Filed: Sep. 19, 2019

(65) Prior Publication Data

US 2020/0095355 A1    Mar. 26, 2020

(30) Foreign Application Priority Data

Sep. 24, 2018    (EP) .................................... 18196373

(51) Int. Cl.
*C08F 220/28* (2006.01)
*C10M 151/02* (2006.01)
*C10N 40/25* (2006.01)

(52) U.S. Cl.
CPC ......... *C08F 220/28* (2013.01); *C10M 151/02* (2013.01); *C08F 220/286* (2020.02); *C10M 2221/02* (2013.01); *C10N 2040/25* (2013.01)

(58) Field of Classification Search
CPC . C08F 220/28; C08F 220/286; C10M 151/02; C10M 2221/02
See application file for complete search history.

(56) References Cited

U.S. PATENT DOCUMENTS

| 2,900,368 A | 8/1959 | Stilmar | |
| 8,951,307 B2* | 2/2015 | Booth | C10L 10/14 |
| | | | 44/389 |
| 2006/0009365 A1 | 1/2006 | Ehran et al. | |
| 2008/0015315 A1* | 1/2008 | Chang | C08F 220/26 |
| | | | 525/326.9 |
| 2011/0263470 A1* | 10/2011 | Qin | C10M 149/06 |
| | | | 508/507 |
| 2011/0286957 A1* | 11/2011 | Prieve | C12N 15/113 |
| | | | 424/78.23 |
| 2017/0298162 A1 | 10/2017 | Jacobine et al. | |
| 2019/0039029 A1* | 2/2019 | Kosar | B01D 71/40 |
| 2020/0347316 A1* | 11/2020 | Yamamoto | C08F 212/08 |

FOREIGN PATENT DOCUMENTS

CH    416120 A    6/1966

OTHER PUBLICATIONS

Tsarevsky et.al., "Reversible Redox Cleavage/Coupling of Polystyrene Disulfide or Thiol Groups Prepared by ATRP," Macromolecules, 35(4), 9009-14, Nov. 19, 2002.
European Search Report for EP Application No. 18196373.7, to which priority is claimed, dated Mar. 25, 2019.

* cited by examiner

*Primary Examiner* — Ellen M McAvoy

(57) ABSTRACT

A polymer having the structure (I):

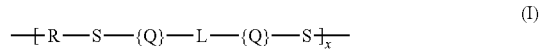

L is a linking group, R is a hydrocarbon group or a substituted-hydrocarbon group, and x is 2 or more, preferably from 2 to 100, more preferably from 2 to 50. Each {Q} is (a) an identical polymer block composed of 3 or more monomer units, or (b) contains a plurality of polymer blocks, each polymer block being composed of 3 or more monomer units, such that the moiety {Q}-L-{Q} has the structure $\{P_n \ldots P_2P_1\}$-L-$\{P_1P_2 \ldots P_n\}$ where each $P_n$ is an individual polymer block, the number of polymer blocks n in each {Q} being the same; wherein for each value of n the polymer blocks are identical; and wherein n is an integer of 2 or more, preferably from 2 to 100, more preferably from 2 to 50.

22 Claims, No Drawings

POLYMERS AND LUBRICATING COMPOSITIONS CONTAINING POLYMERS

This invention relates to polymers and in particular to amphiphilic block polymers. The invention also relates to lubricating compositions (lubricants) containing the polymers and the use of the polymers as additives for lubricants. Lubricants of particular interest are lubricating oil compositions such as those used to lubricate the crankcase of spark-ignited and compression-ignited internal combustion engines. The polymers provide friction reducing properties to lubricants such as lubricating oil compositions thereby improving efficiency and helping to reduce wear.

There is much interest in improving the fuel economy of gasoline and diesel engines. This can be done, through the lubricant engine oil, by reducing the friction contribution either of the bulk fluid (by lowering the oil viscosity) or reducing friction between the contacting parts by the inclusion of friction modifier additives.

In a first aspect, the invention provides a polymer having the structure (I):

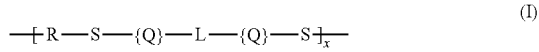
(I)

wherein L is a linking group, R is a hydrocarbon group or a substituted-hydrocarbon group, and x is 2 or more, preferably from 2 to 100, more preferably from 2 to 50; and wherein each {Q} is
(a) an identical polymer block composed of 3 or more monomer units, or
(b) contains a plurality of polymer blocks, each polymer block being composed of 3 or more monomer units, such that the moiety {Q}-L-{Q} has the structure {$P_n$ . . . $P_2P_1$}-L-{$P_1P_2$ . . . $P_n$} where each $P_n$ is an individual polymer block, the number of polymer blocks n in each {Q} being the same; wherein for each value of n the polymer blocks are identical; and wherein n is an integer of 2 or more, preferably from 2 to 100, more preferably from 2 to 50.

Like all polymers, the polymers of the invention will inevitably be a mixture of molecules having a distribution of molecular weights. Accordingly, it will be understood that the value x in structure (I) represents an average value of the molecules present in a mixture.

The number of polymer blocks in each {Q} present in polymers according to embodiment (b), that is, the value of n in $P_n$ . . . $P_2P_1$, is at least 2 and may for example be from 2 to 50, such as from 2 to 10. In preferred embodiments, polymers according to embodiment (b) have 2, 3, 4 or 5 polymer blocks in each {Q}, more preferably 2 or 3.

In both embodiment (a) and embodiment (b) each polymer block in {Q} is composed of a minimum of 3 monomer units. There may be for example from 3 to 100 monomer units in a block, preferably 3 to 50, more preferably 5 to 30, for example 5 to 20. Polymer blocks containing more than 100 repeat monomer units are also possible. The polymer blocks may be formed from only one type of monomer, that is they are homo-polymer blocks or they may be co-polymer blocks formed from more than one type of monomer. Preferably, each polymer block in {Q} is a homo-polymer block. In the embodiment (b) where {Q} comprises a plurality of polymer blocks, each polymer block is preferably a homo-polymer block although structures where each polymer block is a co-polymer block, or where one or more polymer blocks are homo-polymer blocks and one or more are co-polymer blocks are also possible. In the embodiment (b) where {Q} comprises a plurality of polymer blocks, adjacent blocks in each {Q} are different and are arranged in a symmetrical fashion around linking group L. So for example, if one polymer block is designated A and a second polymer block is designated B, then examples of moiety {Q}-L-{Q} include AB-L-BA, BA-L-AB, ABA-L-ABA, BAB-L-BAB, and the like. And if a third polymer block C is used then moiety {Q}-L-{Q} may for example be ABC-L-CBA, CBA-L-ABC, ABCA-L-ACBA, ABCABC-L-CBACBA, and the like. It will be understood that fourth, fifth, and further polymer blocks (D, E . . . ) may be included following the same pattern. Arrangements such as AAB-L-BAA, ABB-L-BBA, and the like have adjacent polymer blocks which are identical so are simply equivalent to examples of moiety {Q}-L-{Q} containing a larger polymer block of a particular type. For example, AAB-L-BAA is equivalent to AB-L-BA as the repeated block of monomer A is equivalent to a larger polymer block of type A. Not included as examples of moiety {Q}-L-{Q} are arrangements such as AB-L-AB, ABC-L-ABC, and the like as the polymer blocks in these moieties are not arranged in a symmetrical fashion around linking group L.

In an embodiment, each polymer block in {Q} has the structure (II):

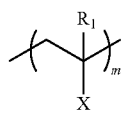
(II)

wherein m is an integer of at least 3; wherein $R_1$ is hydrogen or methyl; wherein X is a hydrocarbon group having from 1 to 50, preferably 1 to 30 carbon atoms, a substituted-hydrocarbon group having from 1 to 50, preferably 1 to 30 carbon atoms, $COOR_2$, $COSR_2$ or $CONR_2R_3$, $OCOR_2$, $CONHR_2$, CN, $COSiR_2R_3R_4$ or Cl wherein $R_2$, $R_3$ and $R_4$ are independently hydrogen, a hydrocarbon group having from 1 to 50, preferably 1 to 30 carbon atoms, or a substituted-hydrocarbon group having from 1 to 50, preferably 1 to 30 carbon atoms; and wherein in each block having structure (II), each $R_1$ and each X and each m may be the same or different.

Hydrocarbon groups are groups which contain hydrogen and carbon only. These include aliphatic, alicyclic, aromatic, aliphatic- and alicyclic-substituted aromatic and aromatic-substituted aliphatic and alicyclic groups. Examples include straight-chain or branched alkyl groups and straight-chain or branched alkenyl groups; cycloalkyl and cycloakenyl groups, alkylcycloalkyl groups, alkenylcycloalkyl groups, alkylcycloalkenyl groups and alkenylcycloalkenyl groups; aryl groups such as phenyl and naphthyl, alkylaryl and alkenylaryl groups such as alkylphenyl and alkenylphenyl; arylalkyl and arylalkenyl groups such as benzyl and phenylalkyl where the alkyl (or alkenyl) groups may be straight-chain or branched.

Substituted-hydrocarbon groups are all the types of groups defined above as hydrocarbon groups which also contain one or more hetero-atoms. The hetero-atoms may be present as functional groups such as hydroxy, alkoxy, acyl, nitro, cyano and thiol or atoms such as oxygen, nitrogen, sulphur, boron, silicon or a halogen may be present in a carbon chain or ring otherwise composed of carbon atoms.

Polyalkylene glycol groups and ether groups are examples of substituted-hydrocarbon groups.

Examples of embodiment (a) when each {Q} in the polymer is an identical polymer block of structure (II) include the following:

Where X is $COOR_2$ and $R_2$ is a straight-chain or branched alkyl group. In this embodiment, when $R_1$ is hydrogen, each polymer block is a polyacrylate, and when $R_1$ is methyl, each polymer block is a polymethacrylate. Preferably $R_1$ is hydrogen. In a preferred embodiment, $R_2$ is 2-ethylhexyl.

Where X is $COOR_2$ and $R_2$ is a polyalkylene glycol residue of the formula $—[(CR_5H)_yO]_zOR_6$ where y is an integer from 2 to 4, preferably 2, and z is from 2 to 100, preferably 2 to 20, for example from 2 to 10. Included are mixtures where residues with different values of z are present. In this case, z represents an average of those residues present in the mixture. $R_5$ is hydrogen or an alkyl group such as methyl or ethyl. Preferably $R_5$ is hydrogen. $R_6$ is hydrogen, an alkyl group such as methyl or ethyl or an aryl group such as phenyl. Preferably, $R_6$ is methyl. In this embodiment, when $R_1$ is hydrogen, each polymer block is a polyalkyleneglycol acrylate, and when $R_1$ is methyl, each polymer block is a polyalkyleneglycol methacrylate. Preferably y is 2 and $R_5$ is hydrogen such that the polymer blocks are either polyethyleneglycol acrylates or polyethyleneglycol methacrylates. In preferred embodiments, $R_5$ is hydrogen, y is 2 and z is 2 such that the polymer blocks are either diethyleneglycol acrylates or diethyleneglycol methacrylates. In other preferred embodiments, y is 2 and z is an average value of 7 to 8 such that the polymer blocks are either oligoethyleneglycol acrylates or oligoethyleneglycol methacrylates. Preferably $R_1$ is hydrogen.

Where X is $CONR_2R_3$ and $R_2$ and $R_3$ are hydrogen. In this embodiment, when $R_1$ is hydrogen, each polymer block is a polyacrylamide, and when $R_1$ is methyl, each polymer block is a polymethacrylamide.

Where X is $COSR_2$ and $R_2$ is a straight-chain or branched alkyl group. In this embodiment, when each $R_1$ is hydrogen, each polymer block is a polythioacrylate, and when each $R_1$ is methyl, each polymer block is a polythiomethacrylate.

In embodiment (b) when each {Q} in the polymer is composed of a plurality of polymer blocks of structure (II), the moiety {Q}-L-{Q} has the structure (III):

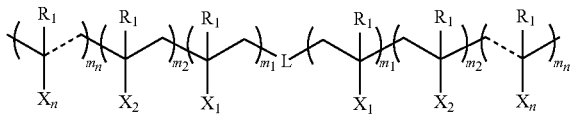

(III)

wherein each $m_1, m_2 \ldots m_n$ is independently an integer of at least 3. $X_1, X_2 \ldots X_n$ are independently as defined as X hereinabove. Preferably, each $m_1, m_2 \ldots m_n$ is independently an integer from 3 to 100, more preferably from 3 to 50, even more preferably from 5 to 30, for example, from 5 to 20.

The number of polymer blocks in structure (III), that is the value of n in $m_1, m_2 \ldots m_n$, is at least 2 and may for example be from 2 to 50, such as from 2 to 10. In preferred embodiments, structure (III) contains 2, 3, 4 or 5 polymer blocks, more preferably 2 or 3.

In an embodiment, $X_1, X_2 \ldots X_n$ are $COOR_2$ where in each instance n, $R_2$ is a straight-chain or branched alkyl group. In this embodiment, when each $R_1$ is hydrogen, each polymer block is a polyacrylate, and when each $R_1$ is methyl, each polymer block is a polymethacrylate. Polymers containing both polyacrylate blocks and polymethacrylate blocks are possible when in at least one instance n, $R_1$ is hydrogen and in at least another instance n, $R_1$ is methyl. Preferably each $R_1$ is hydrogen.

In another embodiment, $X_1, X_2 \ldots X_n$ are $COOR_2$ where in each instance n, $R_2$ is a polyalkylene glycol residue of the formula $—[(CR_5H)_yO]_zOR_6$ where y is an integer from 2 to 4, preferably 2, and z is from 2 to 100, preferably 2 to 20, for example from 2 to 10. Included are mixtures where residues with different values of z are present. In this case, z represents an average of those residues present in the mixture. $R_5$ is hydrogen or an alkyl group such as methyl or ethyl. Preferably $R_5$ is hydrogen. $R_6$ is hydrogen, an alkyl group such as methyl or ethyl or an aryl group such as phenyl. Preferably, $R_6$ is methyl. In this embodiment, when $R_1$ is hydrogen, each polymer block is a polyalkyleneglycol acrylate, and when $R_1$ is methyl, each polymer block is a polyalkyleneglycol methacrylate. Preferably y is 2 and $R_5$ is hydrogen such that the polymer blocks are either polyethyleneglycol acrylates or polyethyleneglycol methacrylates. In preferred embodiments, $R_5$ is hydrogen, y is 2 and z is 2 such that the polymer blocks are either diethyleneglycol acrylates or diethyleneglycol methacrylates. In other preferred embodiments, y is 2 and z is an average value of 7 to 8 such that the polymer blocks are either oligoethyleneglycol acrylates or oligoethyleneglycol methacrylates. Polymers containing both polyalkyleneglycol acrylate blocks and polalkyleneglycol methacrylate blocks are possible when in at least one instance n, $R_1$ is hydrogen and in at least another instance n, $R_1$ is methyl. Preferably each $R_1$ is hydrogen.

In another embodiment, $X_1, X_2 \ldots X_n$ are $CONR_2R_3$ where in each instance n, $R_2$ and $R_3$ are hydrogen. In this embodiment, when each $R_1$ is hydrogen, each polymer block is a polyacrylamide, and when each $R_1$ is methyl, each polymer block is a polymethacrylamide. Polymers containing both polyacrylamide blocks and polymethacrylamide blocks are possible when in at least one instance n, $R_1$ is hydrogen and in at least another instance n, $R_1$ is methyl. Preferably each $R_1$ is hydrogen. In an analogous fashion, one or both of $R_2$ and $R_3$ may be hydrocarbon groups or substituted-hydrocarbon groups as defined hereinabove.

In another embodiment, $X_1, X_2 \ldots X_n$ are $COSR_2$ where in each instance n, $R_2$ is a straight-chain or branched alkyl group. In this embodiment, when each $R_1$ is hydrogen, each polymer block is a polythioacrylate, and when each $R_1$ is methyl, each polymer block is a polythiomethacrylate. Polymers containing both polythioacrylate blocks and polythiomethacrylate blocks are possible when in at least one instance n, $R_1$ is hydrogen and in at least another instance n, $R_1$ is methyl. Preferably each $R_1$ is hydrogen.

In a preferred embodiment, $X_1, X_2 \ldots X_n$ are $COOR_2$ and n is at least 2. In this embodiment in at least one instance n, $R_2$ is a straight-chain or branched alkyl group, and in at least one other instance n, $R_2$ is a polyalkylene glycol residue of the formula $—[(CR_5H)_yO]_zOR_6$ where y, z, $R_5$ and $R_6$ are as described hereinabove. Preferably $R_5$ is hydrogen. Preferably, $R_6$ is methyl.

In a preferred embodiment of structure (III), each $R_1$ is hydrogen, $X_1, X_2 \ldots X_n$ are $COOR_2$ and n is 2. In one instance n, $R_2$ is a branched alkyl group and in the other instance n, $R_2$ is a polyalkylene glycol residue of the formula $—[(CR_5H)_yO]_zOR_6$ where y, z, $R_5$ and $R_6$ are as described hereinabove. Preferably $R_5$ is hydrogen. Preferably, R is methyl. In this embodiment, the branched alkyl group is preferably 2-ethylhexyl. The polyalkylene glycol residue is preferably a polyethylene glycol residue (where y is 2) and is preferably a diethylene glycol residue (where y is 2 and z is 2) or an oligoethylene glycol residue (where y is 2 and z is an average of 7 to 8). In a particularly preferred embodiment of structure (III), each $R_1$ is hydrogen, $X_1, X_2 \ldots X_n$ are $COOR_2$ and n is 2; in one instance n, $R_2$ is 2-ethylhexyl; and in the other instance n, $R_2$ is a polyalkylene glycol residue of the formula $—[(CH_2)_yO]_zOMe$ where y is 2 and z is 2. In another particularly preferred embodiment of structure (III), each $R_1$ is hydrogen, $X_1, X_2 \ldots X_n$ are $COOR_2$ and n is 2; in one instance n, $R_2$ is 2-ethylhexyl; and in the other instance n, $R_2$ is a polyalkylene glycol residue of the formula $—[(CH_2)_yO]_zOMe$ where y is 2 and z is an average of 7 to 8.

In another preferred embodiment of structure (III), each $R_1$ is hydrogen, $X_1, X_2 \ldots X_n$ are $COOR_2$ and n is 3. In one instance n, $R_2$ is a branched alkyl group and in the other two instances n, $R_2$ is a polyalkylene glycol residue of the formula $—[(CR_5H)_yO]_zOR_6$ where y, z, $R_5$ and $R_6$ are as described hereinabove. Preferably $R_5$ is hydrogen. Preferably, $R_6$ is methyl. Preferably in each of these two instances n, each polyalkylene glycol residue $R_2$ is the same. In this embodiment, the branched alkyl group is preferably 2-ethylhexyl. The polyalkylene glycol residues are preferably polyethylene glycol residues (where y is 2) and are preferably diethylene glycol residues (where y is 2 and z is 2) or oligoethylene glycol residues (where y is 2 and z is an average of 7 to 8). In a particularly preferred embodiment of structure (II), each $R_1$ is hydrogen, $X_1, X_2 \ldots X_n$ are $COOR_2$ and n is 3; in one instance n, $R_2$ is 2-ethylhexyl; and in the other two instances n, each $R_2$ is a polyalkylene glycol residue of the formula $—[(CH_2)_yO]_zOMe$ where y is 2 and z is 2. In another particularly preferred embodiment of structure (III), each $R_1$ is hydrogen, $X_1, X_2 \ldots X_n$ are $COOR_2$ and n is 3; in one instance n, $R_2$ is 2-ethylhexyl; and in the other two instances n, each $R_2$ is a polyalkylene glycol residue of the formula $—[(CH_2)_yO]_zOMe$ where y is 2 and z is an average value of 7 to 8. In an alternative embodiment, in two instances, $R_2$ is a branched alkyl group and in one instance, $R_2$ is a polyalkylene glycol residue, both as defined above.

In a preferred embodiment, the polymer is in accordance with embodiment (b) as defined in relation to the first aspect.

The choice of linking group L is not critical. Suitable are groups such as the hydrocarbon groups and substituted-hydrocarbon groups defined hereinabove. Typically, the linking group L will be the residue of a di-functional initiator molecule which is effective to initiate polymerisation of the monomers used to form the polymer blocks. Such di-functional initiator molecules are well known in the art and include di-halo species, particularly di-bromo species. Examples of linking group L include:

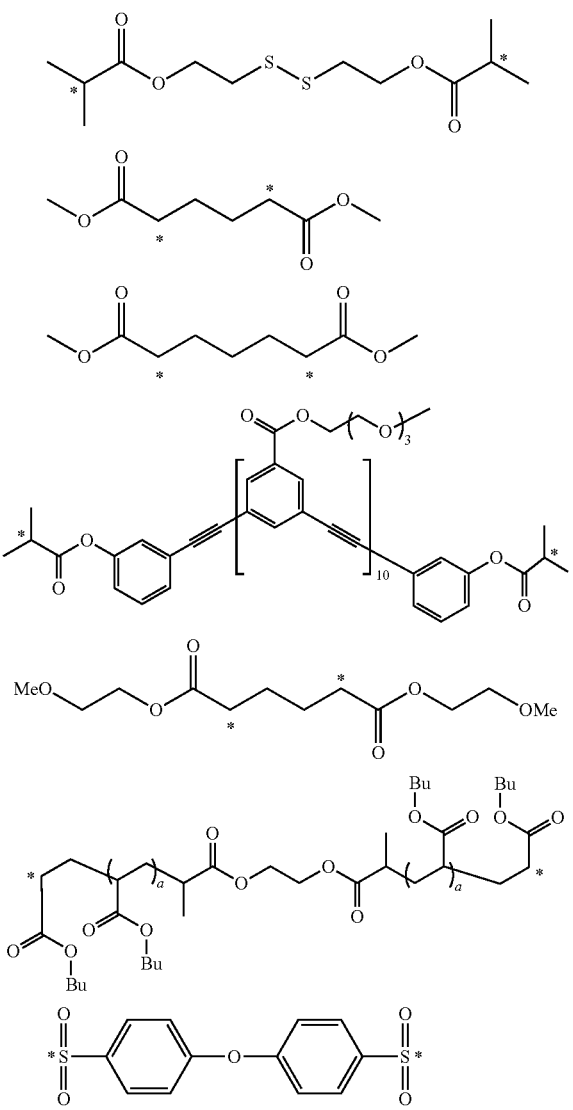

where *indicates the points of attachment to the remainder of the polymer (i.e. to groups {Q}), and where a is an integer from 1 to 100, preferably from 1 to 30, for example, from 1 to 10.

The choice of group R is also not critical. Suitable are groups such as the hydrocarbon groups and substituted-hydrocarbon groups defined hereinabove. Examples of hydrocarbon groups are straight-chain and branched alkyl groups, alkenyl groups, cycloalkyl groups, cycloalkenyl groups, alkylcycloalkyl groups, alkenylcycloalkyl groups, alkylcycloalkenyl groups, alkenylcycloalkenyl groups, aryl groups, alkylaryl groups, alkenylaryl groups where the alkyl or alkenyl substituent(s) may be straight-chain or branched. Examples of substituted-hydrocarbon groups are the groups defined above containing one or more hetero-atoms. These hetero-atoms may be present as functional groups such as hydroxy, alkoxy, acyl, nitro, cyano and thiol or atoms such as oxygen, nitrogen and sulphur may be present in a carbon chain or ring otherwise composed of carbon atoms, or as a connecting atom between two or more hydrocarbon or substituted-hydrocarbon groups.

Specific examples of hydrocarbon groups R include:
*—CH$_2$—CH$_2$—*
*—CH$_2$—CH$_2$—CH$_2$—*
*—CH$_2$—CH$_2$—CH$_2$—CH$_2$—*
etc.
*—CH$_2$—Z—CH$_2$—*
*—CH$_2$—CH$_2$—Z—CH$_2$—CH$_2$—*
etc. Z=S, O, NH

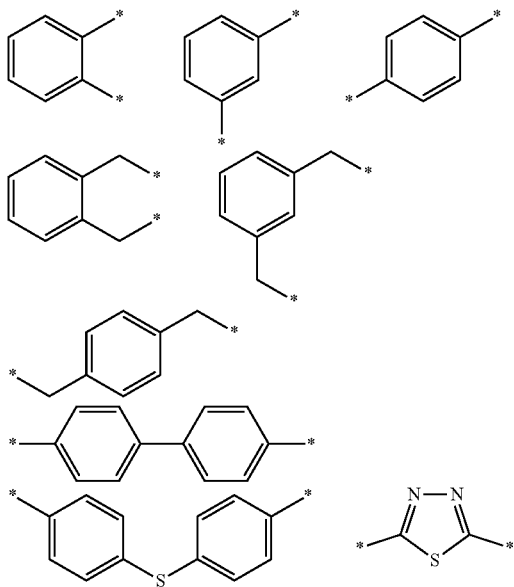

where *indicates the points of attachment to the remainder of the polymer, i.e. to the S atoms in formula (I).

It will be understood that numerous other groups R will also be suitable. Typically, the group R is a portion of the residue of a bisthiol compound. With reference to structure (I) above, each moiety {Q}-L-{Q} is linked together by a bisthiol residue —S—R—S— to form repeating units in the polymer. Those skilled in the art will recognise that the critical factor is the presence of the bisthiol residue and not the particular nature of the group R.

Polymer Synthesis

A general synthesis of polymers according to the invention will be described with reference to polymers comprised of acrylate polymer blocks, or of acrylate polymer blocks and ethyleneglycol acrylate polymer blocks, however those skilled in the art will recognise that the synthesis is equally applicable to polymers comprised of the other types of polymer block described hereinabove. The synthesis is provided to illustrate a method suitable to produce polymers according to the present invention however the invention is not intended to be limited to polymers made by any particular synthetic method. It will be understood by those skilled in the art, that other synthetic methods may alternatively be used.

To produce a polymer according to embodiment (a) wherein each {Q} in structure (I) is an identical polymer block, an acrylate monomer is first polymerised by initiating polymerisation using a di-bromo initiator of the structure Br-L-Br, where L is the linking group described hereinabove. Equivalent di-chloro or di-iodo initiators could also be used. The resulting moiety has the structure Br-{Q}-L-{Q}-Br, where each {Q} is an identical polyacrylate polymer block. The polymerisation is conveniently catalysed using a transition metal-ligand complex as a catalyst. Suitable transition metals include copper, iron, nickel, titanium, cobalt, molybdenum, ruthenium and rhodium. Copper is preferred. The ligand used to form the transition metal-ligand complex is conveniently a nitrogen-containing ligand and multidentate nitrogen-containing ligands which co-ordinate to the transition metal via nitrogen atoms are preferred. A preferred example is tris(2-dimethylaminoethyl) amine (Me$_6$TREN).

In a second stage, the moiety Br-{Q}-L-{Q}-Br is treated with a bisthiol compound SH—R—SH to initiate a "thio-bromo click" reaction whereby moieties {Q}-L-{Q} are joined together by S—R—S moieties, with the elimination of HBr. The number of repeat units in the polymer, signified by the value of x in structure (I), is determined by the number of moles of moiety Br-{Q}-L-{Q}-Br and the number of moles of bisthiol used. This stage is preferably carried out in the presence of a base, preferably an organic base such as an alkylamine. As discussed above, the polymer will inevitably be a mixture of molecules with a range of molecular weights so the value of x represent an average of the molecules in the mixture formed. Any organic base can be used but preferred are alkylamines such as triethylamine.

The bisthiol compound may conveniently be added directly to the reaction mixture from the first stage or the intermediate product from the first stage may be first isolated and then reacted with the bisthiol compound.

To produce a polymer according to embodiment (b) wherein each {Q} in structure (I) contains two polymer blocks $P_1$ and $P_2$, an acrylate monomer is first polymerised by initiating polymerisation using a di-bromo initiator of the structure Br-L-Br, where L is the linking group described hereinabove. As before, equivalent di-chloro or di-iodo initiators could also be used. The resulting moiety has the structure Br—{$P_1$}-L-{$P_1$}—Br, where each {$P_1$} is an identical polyacrylate polymer block. An ethyleneglycol acrylate monomer is then polymerised in the same fashion, the moiety Br—{$P_1$}-L-{$P_1$}—Br acting as a the di-bromo initiator. This results in a moiety having the structure Br—{$P_2P_1$}-L-{$P_1P_2$}—Br where each $P_2$ is an identical polyethyleneglycol acrylate polymer block. Again, the polymerisations are conveniently catalysed using a transition metal-ligand complex as a catalyst.

As before in a second stage, moiety Br—{$P_2P_1$}-L-{$P_1P_2$}—Br is treated with a bisthiol compound SH—R—SH to initiate a "thio-bromo click" reaction whereby moieties Br—{$P_2P_1$}-L-{$P_1P_2$}—Br are joined together by S—R—S moieties, with the elimination of HBr. A base is preferably present, for example an organic base such as an alkylamine.

It will be readily apparent that analogous polymers where each {Q} has multiple polymer blocks {$P_n$ ... $P_2P_1$} can be produced by simply repeating the first stage using a further or different monomer and each time utilising the moiety Br—{$P_n$ ... $P_2P_1$}-L-{$P_1P_2$ ... $P_n$}—Br as the di-bromo initiator.

Some preferred, but non-limiting, examples of polymers according to the present invention are those with the following structures:

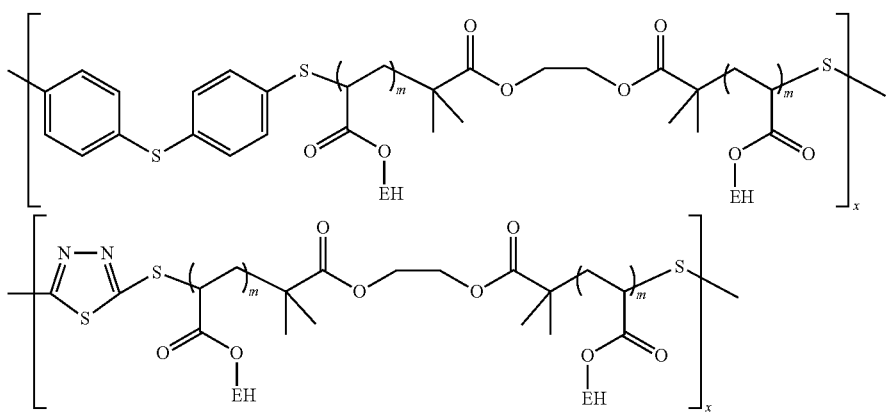

where 'EH' is a 2-ethylhexyl group, m is from 2 to 100, for example 5 to 40, and x is from 2 to 100, for example 2 to 15.

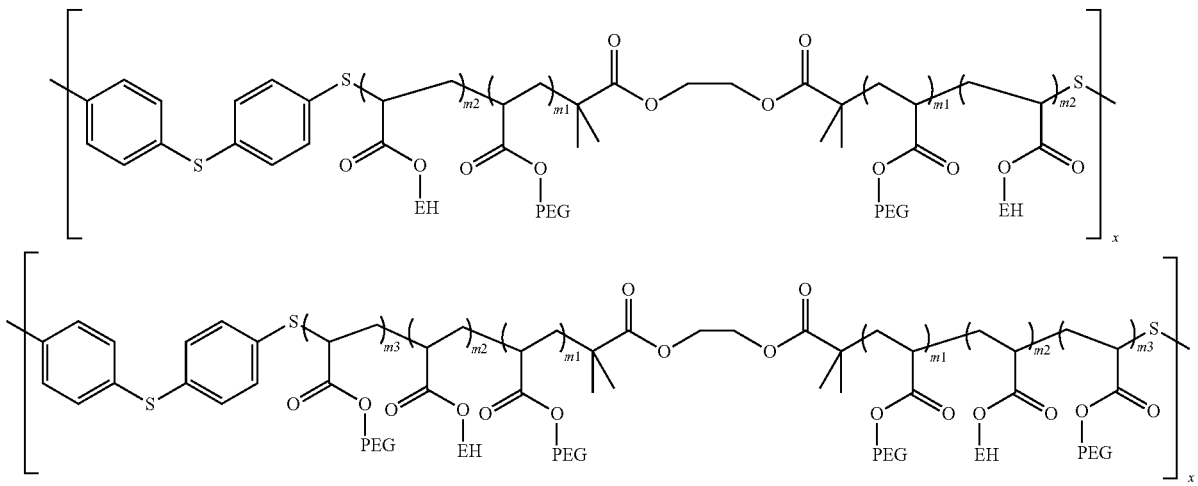

where 'EH' is a 2-ethylhexyl group, 'PEG' is a polyethylene glycol group, for example a diethylene glycol group or an oligoethylene glycol group, $m_1$, $m_2$ and $m_3$ are independently from 2 to 100, for example 5 to 40, and x is from 2 to 100, for example 2 to 15.

In this specification, the following words and expressions, if and when used, have the meaning given below:

"active ingredients" or "(a.i.)" refers to additive material that is not diluent or solvent;

"comprising" or any cognate word specifies the presence of stated features, steps, or integers or components, but does not preclude the presence or addition of one or more other features, steps, integers, components or groups thereof. The expressions "consists of or "consists essentially of or cognates may be embraced within "comprises" or any cognate word. The expression "consists essentially of permits inclusion of substances not materially affecting the characteristics of the composition to which it applies. The expression "consists of or cognates means only the stated features, steps, integers components or groups thereof are present to which the expression refers;

"oil-soluble" or "oil-dispersible", or cognate terms, used herein do not necessarily indicate that the compounds or additives are soluble, dissolvable, miscible, or are capable of being suspended in an oil in all proportions. These do mean, however, that they are, for example, soluble or stably dispersible in oil to an extent sufficient to exert their intended effect in the environment in which the oil is employed. Moreover, the additional incorporation of other additives may also permit incorporation of higher levels of a particular additive, if desired;

"ashless" in relation to an additive means the additive does not include a metal;

"ash-containing" in relation to an additive means the additive includes a metal;

"major amount" means in excess of 50 mass % of a composition or mixture;

"minor amount" means 50 mass % or less of a composition or mixture;

"effective amount" in respect of an additive means an amount of such an additive in the composition (e.g. an additive concentrate) that is effective to provide, and provides, the desired technical effect;

"ppm" means parts per million by mass, based on the total mass of a composition;

"metal content" of a composition or of an additive component, for example molybdenum content or total metal content of the additive concentrate (i.e. the sum of all individual metal contents), is measured by ASTM D5185;

"TBN" in relation to an additive component or of a composition, means total base number (mg KOH/g) as measured by ASTM D2896;

"$KV_{100}$" means kinematic viscosity at 100° C. as measured by ASTM D445;

HTHS means High Temperature High Shear at 150° C. as measured by —CEC-L-36-A-90, "phosphorus content" is measured by ASTM D5185;

"sulfur content" is measured by ASTM D2622;

"sulfated ash content" is measured by ASTM D874;

$M_n$ means number average molecular weight as measured by Gel Permeation Chromatography with reference to linear narrow poly(methylmethacrylate) standards in the range of 550 to 600,000 g/mol;

$M_w$ means weight average molecular weight as measured by Gel Permeation Chromatography with reference to linear narrow poly(methylmethacrylate) standards in the range of 550 to 600,000 g/mol;

"dispersity" means $M_w/M_n$, (denoted by Đ).

Also, it will be understood that various components used, essential as well as optimal and customary, may react under condition of formulation, storage and use and that the invention also provides the product(s) obtainable or obtained by any such reaction.

Further it is understood that any upper and lower quality, range or ratio limits set forth herein may be independently combined.

Lubricating Compositions

In a second aspect, the present invention provides a lubricating composition comprising a major amount of a base lubricant and a minor amount of a polymer according to the first aspect of the invention. The polymers provide friction reducing properties to lubricants. The use of such lubricants to lubricate machines such as engines, transmissions, gears and the like thus improve the efficiency of the machine and helps to reduce wear of contacting machine parts.

The base lubricant may be a lubricating oil, a grease or a fuel oil. In a preferred embodiment, the base lubricant is a lubricating oil such that the lubricating composition is a lubricating oil composition.

Lubricating oil compositions of the invention may be for example, lubricants suitable for use as motor vehicle motor oils and comprise a major amount of oil of lubricating viscosity and a minor amount of a polymer according to the first aspect of the invention. Typically, lubricating oil compositions will also contain other performance-enhancing additives (co-additives), in addition to the polymer. The lubricating composition may also be in the form of an additive concentrate for blending with oil of lubricating viscosity to make a final lubricant.

The lubricating oil compositions of the invention will contain 0.01 to 10 percent by weight, based on the weight of the composition of the polymer of the present invention, more preferably 0.01 to 5, for example up to 0.5, 1, 2, 3 or 4 percent by weight, based on the weight of the composition. When in the form of an additive concentrate, typically the polymer will be present in an oil of lubricating viscosity, or other suitable carrier fluid, in an amount of 0.07 to 70 percent by weight, based on the weight of the composition.

The oil of lubricating viscosity (sometimes referred to as "base stock" or "base oil") is the primary liquid constituent of a lubricant, into which additives and possibly other oils are blended, for example to produce a final lubricant (or lubricant composition). A base oil, which is useful for making additive concentrates as well as for making lubricating oil compositions therefrom, may be selected from natural oils (vegetable, animal or mineral) and synthetic lubricating oils and mixtures thereof.

Definitions for the base stocks and base oils in this invention are the same as those found in the American Petroleum Institute (API) publication "Engine Oil Licensing and Certification System". Industry Services Department, Fourteenth Edition, December 1996, Addendum 1, December 1998, which categorizes base stocks as follows:

a) Group I base stocks contain less than 90 percent saturates and/or greater than 0.03 percent sulphur and have a viscosity index greater than or equal to 80 and less than 120 using the test methods specified in Table E-1.

b) Group II base stocks contain greater than or equal to 90 percent saturates and less than or equal to 0.03 percent sulphur and have a viscosity index greater than or equal to 80 and less than 120 using the test methods specified in Table E-1.

c) Group III base stocks contain greater than or equal to 90 percent saturates and less than or equal to 0.03 percent sulphur and have a viscosity index greater than or equal to 120 using the test methods specified in Table E-1.

d) Group IV base stocks are polyalphaolefins (PAO).

e) Group V base stocks include all other base stocks not included in Group I, II, III, or IV.

Typically, the base stock has a viscosity preferably of 3-12, more preferably 4-10, most preferably 4.5-8, mm²/s at 100° C.

TABLE E-1

Analytical Methods for Base Stock

| Property | Test Method |
| --- | --- |
| Saturates | ASTM D 2007 |
| Viscosity Index | ASTM D 2270 |
| Sulphur | ASTM D 2622 |
|  | ASTM D 4294 |
|  | ASTM D 4927 |
|  | ASTM D 3120 |

Preferably, the oil of lubricating viscosity comprises greater than or equal to 10, more preferably greater than or equal to 20, even more preferably greater than or equal to 25, even more preferably greater than or equal to 30, even more preferably greater than or equal to 40, even more preferably greater than or equal to 45, mass % of a Group II or Group III base stock, based on the total mass of the oil of lubricating viscosity. Even more preferably, the oil of lubricating viscosity comprises greater than 50, preferably greater than or equal to 60, more preferably greater than or equal to 70, even more preferably greater than or equal to 80, even more preferably greater than or equal to 90, mass % of a Group II or Group III base stock, based on the total mass of the oil of lubricating viscosity. Most preferably, the oil of lubricating viscosity consists essentially of a Group II and/or Group III base stock. In some embodiments the oil of lubricating viscosity consists solely of Group II and/or Group III base stock. In the latter case it is acknowledged that additives included in the lubricating oil composition may comprise a carrier oil which is not a Group II or Group III base stock.

Other oils of lubricating viscosity that may be included in the lubricating oil composition are detailed as follows:

Natural oils include animal and vegetable oils (e.g. castor and lard oil), liquid petroleum oils and hydro refined, solvent-treated mineral lubricating oils of the paraffinic, naphthenic and mixed paraffinic-naphthenic types. Oils of lubricating viscosity derived from coal or shale are also useful base oils.

Synthetic lubricating oils include hydrocarbon oils such as polymerized and interpolymerized olefins (e.g. polybutylenes, polypropylenes, propylene-isobutylene copolymers, chlorinated polybutylenes, poly(1-hexenes), poly(1-octenes), poly(1-decenes)); alkylbenzenes (e.g. dodecylbenzenes, tetradecylbenzenes, dinonylbenzenes, di(2-ethylhexyl)benzenes); polyphenols (e.g. biphenyls, terphenyls, alkylated polyphenols); and alkylated diphenyl ethers and alkylated diphenyl sulfides and the derivatives, analogues and homologues thereof.

Another suitable class of synthetic lubricating oil comprises the esters of dicarboxylic acids (e.g. phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g. butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebasic acid with two moles of tetraethylene glycol and two moles of 2-ethylhexanoic acid.

Esters useful as synthetic oils also include those made from $C_5$ to $C_{12}$ monocarboxylic acids and polyols, and polyol ethers such as neopentyl glycol, trimethylolpropane, pentaerythritol, dipentaerythritol and tripentaerythritol.

Unrefined, refined and re-refined oils can be used in the compositions of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be unrefined oil. Refined oils are similar to the unrefined oils except they have been further treated in one or more purification steps to improve one or more properties. Many such purification techniques, such as distillation, solvent extraction, acid or base extraction, filtration and percolation, are known to those skilled in the art. Re-refined oils are obtained by processes similar to those used to obtain refined oils applied to refined oils that have been already used in service. Such re-refined oils are also known as reclaimed or reprocessed oils and often are additionally processed by techniques for treating spent additive and oil breakdown products.

Other examples of base oil are gas-to-liquid ("GTL") base oils, i.e. the base oil may be an oil derived from Fischer-Tropsch synthesised hydrocarbons made from synthesis gas containing $H_2$ and CO using a Fischer-Tropsch catalyst. These hydrocarbons typically require further processing in order to be useful as a base oil. For example, they may, by methods known in the art, be hydroisomerized; hydrocracked and hydroisomerized; dewaxed; or hydroisomerized and dewaxed.

The oil of lubricating viscosity may also comprise a Group I, Group IV or Group V base stocks or base oil blends of the aforementioned base stocks.

The lubricating compositions of the present invention preferably comprise at least 60% by weight, for example 70% by weight or more of an oil of lubricating viscosity, based on the weight of the composition.

Co-Additives

The lubricating compositions, particularly lubricating oil compositions, of the present invention may further comprise one or more phosphorus-containing compounds; oxidation inhibitors or anti-oxidants; dispersants; metal detergents; anti-wear agents; friction modifiers, viscosity modifiers and other co-additives, provided they are different from the polymer of the present invention. These will be discussed in more detail below.

Suitable phosphorus-containing compounds include dihydrocarbyl dithiophosphate metal salts, which are frequently used as antiwear and antioxidant agents. The metal is preferably zinc, but may be an alkali or alkaline earth metal, or aluminum, lead, tin, molybdenum, manganese, nickel or copper. The zinc salts are most commonly used in lubricating oil in amounts of 0.1 to 10, preferably 0.2 to 2 mass %, based upon the total weight of the lubricating oil composition. They may be prepared in accordance with known techniques by first forming a dihydrocarbyl dithiophosphoric acid (DDPA), usually by reaction of one or more alcohol or a phenol with $P_2S_5$, and then neutralizing the formed DDPA with a zinc compound. For example, a dithiophosphoric acid may be made by reacting mixtures of primary and secondary alcohols. Alternatively, multiple dithiophosphoric acids can be prepared where the hydrocarbyl groups on one are entirely secondary in character and the hydrocarbyl groups on the others are entirely primary in character. To make the zinc salt, any basic or neutral zinc compound could be used but the oxides, hydroxides and carbonates are most generally employed. Commercial additives frequently contain an excess of zinc due to the use of an excess of the basic zinc compound in the neutralization reaction.

The preferred zinc dihydrocarbyl dithiophosphates are oil-soluble salts of dihydrocarbyl dithiophospsphoric acids and may be represented by the following formula:

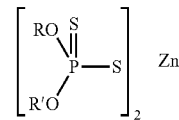

wherein R and R' may be the same or different hydrocarbyl radicals containing from 1 to 18, preferably 2 to 12, carbon atoms and including radicals such as alkyl, alkenyl, aryl, arylalkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl. In order to obtain oil solubility, the total number of carbon atoms (i.e. R and R') in the dithiophosphoric acid will generally be 5 or greater. The zinc dihydrocarbyl dithiophosphate (ZDDP) can therefore comprise zinc dialkyl dithiophosphates. Lubricating oil compositions of the present invention suitably may have a phosphorus content of no greater than about 0.08 mass % (800 ppm). Preferably, in the practice of the present invention, ZDDP is used in an amount close or equal to the maximum amount allowed, preferably in an amount that provides a phosphorus content within 100 ppm of the maximum allowable amount of phosphorus. Thus, lubricating oil compositions useful in the practice of the present invention preferably contain ZDDP or other zinc-phosphorus compounds, in an amount introducing from 0.01 to 0.08 mass % of phosphorus, such as from 0.04 to 0.08 mass % of phosphorus, preferably, from 0.05 to 0.08 mass % of phosphorus, based on the total mass of the lubricating oil composition.

Oxidation inhibitors or antioxidants reduce the tendency of mineral oils to deteriorate in service. Oxidative deterioration can be evidenced by sludge in the lubricant, varnish-like deposits on the metal surfaces, and by viscosity growth. Such oxidation inhibitors include hindered phenols, alkaline earth metal salts of alkylphenolthioesters having preferably $C_5$ to $C_{12}$ alkyl side chains, calcium nonylphenol sulfide, oil soluble phenates and sulfurized phenates, phosphosulfurized or sulfurized hydrocarbons or esters, phosphorous esters, metal thiocarbamates, oil soluble copper compounds as described in U.S. Pat. No. 4,867,890, and molybdenum-containing compounds.

Aromatic amines having at least two aromatic groups attached directly to the nitrogen constitute another class of compounds that is frequently used for antioxidancy. Typical oil-soluble aromatic amines having at least two aromatic groups attached directly to one amine nitrogen contain from 6 to 16 carbon atoms. The amines may contain more than two aromatic groups. Compounds having a total of at least three aromatic groups in which two aromatic groups are linked by a covalent bond or by an atom or group (e.g., an oxygen or sulfur atom, or a —CO—, —$SO_2$— or alkylene group) and two are directly attached to one amine nitrogen are also considered aromatic amines having at least two aromatic groups attached directly to the nitrogen. The aromatic rings are typically substituted by one or more substituents selected from alkyl, cycloalkyl, alkoxy, aryloxy, acyl, acylamino, hydroxy, and nitro groups. The amount of any such oil soluble aromatic amines having at least two aromatic groups attached directly to one amine nitrogen should preferably not exceed 0.4 mass %.

A dispersant is an additive whose primary function is to hold solid and liquid contaminations in suspension, thereby passivating them and reducing engine deposits at the same time as reducing sludge depositions. For example, a dispersant maintains in suspension oil-insoluble substances that result from oxidation during use of the lubricant, thus preventing sludge flocculation and precipitation or deposition on metal parts of the engine.

Dispersants in this invention are preferably "ashless", as mentioned above, being non-metallic organic materials that form substantially no ash on combustion, in contrast to metal-containing and hence ash-forming materials. They comprise a long hydrocarbon chain with a polar head, the polarity being derived from inclusion of e.g. an O, P, or N atom. The hydrocarbon is an oleophilic group that confers oil-solubility, having, for example 40 to 500 carbon atoms. Thus, ashless dispersants may comprise an oil-soluble polymeric backbone.

A preferred class of olefin polymers is constituted by polybutenes, specifically polyisobutenes (PIB) or poly-n-butenes, such as may be prepared by polymerization of a $C_4$ refinery stream.

Dispersants include, for example, derivatives of long chain hydrocarbon-substituted carboxylic acids, examples being derivatives of high molecular weight hydrocarbyl-substituted succinic acid. A noteworthy group of dispersants is constituted by hydrocarbon-substituted succinimides, made, for example, by reacting the above acids (or derivatives) with a nitrogen-containing compound, advantageously a polyalkylene polyamine, such as a polyethylene polyamine. Particularly preferred are the reaction products of polyalkylene polyamines with alkenyl succinic anhydrides, such as described in U.S. Pat. Nos. 3,202,678; 3,154,560; 3,172,892; 3,024,195; 3,024,237, 3,219,666; and 3,216,936, that may be post-treated to improve their properties, such as borated (as described in U.S. Pat. Nos. 3,087,936 and 3,254,025), fluorinated or oxylated. For example, boration may be accomplished by treating an acyl nitrogen-containing dispersant with a boron compound selected from boron oxide, boron halides, boron acids and esters of boron acids.

Preferably, the dispersant, if present, is a succinimide-dispersant derived from a polyisobutene of number average molecular weight in the range of 1000 to 3000, preferably 1500 to 2500, and of moderate functionality. The succinimide is preferably derived from highly reactive polyisobutene.

Another example of dispersant type that may be used is a linked aromatic compound such as described in EP-A-2 090 642.

A detergent is an additive that reduces formation of piston deposits, for example high-temperature varnish and lacquer deposits in engines; it normally has acid-neutralising properties and is capable of keeping finely-divided solids in suspension. Most detergents are based on metal "soaps", that is metal salts of acidic organic compounds.

Detergents generally comprise a polar head with a long hydrophobic tail, the polar head comprising the metal salt of the acidic organic compound. The salts may contain a substantially stoichiometric amount of the metal when they are usually described as normal or neutral salts and would typically have a total base number or TBN at 100% active mass (as may be measured by ASTM D2896) of from 0 to 80. Large amounts of a metal base can be included by reaction of an excess of a metal compound, such as an oxide or hydroxide, with an acidic gas such as carbon dioxide.

The resulting overbased detergent comprises neutralised detergent as an outer layer of a metal base (e.g. carbonate) micelle. Such overbased detergents may have a TBN at 100% active mass of 150 or greater, and typically of from 200 to 500 or more.

Suitably, detergents that may be used include oil-soluble neutral and overbased sulfonates, phenates, sulfurised phenates, thiophosphonates, salicylates and naphthenates and other oil-soluble carboxylates of a metal, particularly alkali metal or alkaline earth metals, e.g. Na, K, Li, Ca and Mg. The most commonly-used metals are Ca and Mg, which may both be present in detergents used in lubricating compositions, and mixtures of Ca and/or Mg with Na. Detergents may be used in various combinations.

Additional additives may be incorporated into the compositions of the invention to enable particular performance requirements to be met. Examples of such additives which may be included in the lubricating oil compositions of the present invention are metal rust inhibitors, viscosity index improvers, corrosion inhibitors, oxidation inhibitors, other friction modifiers, anti-foaming agents, anti-wear agents and pour point depressants. Some are discussed in further detail below.

Friction modifiers and fuel economy agents that are compatible with the other ingredients of the final oil may also be included. Examples of such materials include glyceryl monoesters of higher fatty acids, for example, glyceryl mono-oleate; esters of long chain polycarboxylic acids with diols, for example, the butane diol ester of a dimerized unsaturated fatty acid; and alkoxylated alkyl-substituted mono-amines, diamines and alkyl ether amines, for example, ethoxylated tallow amine and ethoxylated tallow ether amine.

Other known friction modifiers comprise oil-soluble organo-molybdenum compounds. Such organo-molybdenum friction modifiers also provide antioxidant and antiwear credits to a lubricating oil composition. Examples of such oil-soluble organo-molybdenum compounds include dithiocarbamates, dithiophosphates, dithiophosphinates, xanthates, thioxanthates, sulfides, and the like, and mixtures thereof. Particularly preferred are molybdenum dithiocarbamates, dialkyldithiophosphates, alkyl xanthates and alckylthioxanthates.

Additionally, the molybdenum compound may be an acidic molybdenum compound. These compounds will react with a basic nitrogen compound as measured by ASTM test D-664 or D-2896 titration procedure and are typically hexavalent. Included are molybdic acid, ammonium molybdate, sodium molybdate, potassium molybdate, and other alkali metal molybdates and other molybdenum salts, e.g., hydrogen sodium molybdate, $MoOCL_4$, $MoO_2Br_2$, $Mo_2O_3Cl_6$, molybdenum trioxide or similar acidic molybdenum compounds.

Among the molybdenum compounds useful in the compositions of this invention are organo-molybdenum compounds of the formulae:

$$Mo(R''OCS_2)_4 \text{ and}$$

$$Mo(R''SCS_2)_4$$

wherein R' is an organo group selected from the group consisting of alkyl, aryl, aralkyl and alkoxyalkyl, generally of from 1 to 30 carbon atoms, and preferably 2 to 12 carbon atoms and most preferably alkyl of 2 to 12 carbon atoms. Especially preferred are the dialkyldithiocarbamates of molybdenum.

Another group of organo-molybdenum compounds useful in the lubricating compositions of this invention are trinuclear molybdenum compounds, especially those of the formula $Mo_3S_kA_nD_z$ and mixtures thereof wherein the A are independently selected ligands having organo groups with a sufficient number of carbon atoms to render the compound soluble or dispersible in the oil, n is from 1 to 4, k varies from 4 to 7, D is selected from the group of neutral electron donating compounds such as water, amines, alcohols, phosphines, and ethers, and z ranges from 0 to 5 and includes non-stoichiometric values. At least 21 carbon atoms should be present among all the ligand organo groups, such as at least 25, at least 30, or at least 35, carbon atoms.

Lubricating oil compositions useful in all aspects of the present invention preferably contain at least 10 ppm, at least 30 ppm, at least 40 ppm and more preferably at least 50 ppm molybdenum. Suitably, lubricating oil compositions useful in all aspects of the present invention contain no more than 1000 ppm, no more than 750 ppm or no more than 500 ppm of molybdenum. Lubricating oil compositions useful in all aspects of the present invention preferably contain from 10 to 1000, such as 30 to 750 or 40 to 500, ppm of molybdenum (measured as atoms of molybdenum).

The viscosity index of the base stock is increased, or improved, by incorporating therein certain polymeric materials that function as viscosity modifiers (VM) or viscosity index improvers (VII). Generally, polymeric materials useful as viscosity modifiers are those having number average molecular weights (Mn) of from 5,000 to 250,000, preferably from 15,000 to 200,000, more preferably from 20,000 to 150,000. These viscosity modifiers can be grafted with grafting materials such as, for example, maleic anhydride, and the grafted material can be reacted with, for example, amines, amides, nitrogen-containing heterocyclic compounds or alcohol, to form multifunctional viscosity modifiers (dispersant-viscosity modifiers).

Polymers prepared with diolefins will contain ethylenic unsaturation, and such polymers are preferably hydrogenated. When the polymer is hydrogenated, the hydrogenation may be accomplished using any of the techniques known in the prior art. For example, the hydrogenation may be accomplished such that both ethylenic and aromatic unsaturation is converted (saturated) using methods such as those taught, for example, in U.S. Pat. Nos. 3,113,986 and 3,700,633 or the hydrogenation may be accomplished selectively such that a significant portion of the ethylenic unsaturation is converted while little or no aromatic unsaturation is converted as taught, for example, in U.S. Pat. Nos. 3,634,595; 3,670,054; 3,700,633 and Re 27,145. Any of these methods can also be used to hydrogenate polymers containing only ethylenic unsaturation and which are free of aromatic unsaturation.

Pour point depressants (PPD), otherwise known as lube oil flow improvers (LOFIs) lower the lowest temperature at which the lube flows. Compared to VM, LOFIs generally have a lower number average molecular weight. Like VM, LOFIs can be grafted with grafting materials such as, for example, maleic anhydride, and the grafted material can be reacted with, for example, amines, amides, nitrogen-containing heterocyclic compounds or alcohol, to form multifunctional additives.

In the present invention it may be necessary to include an additive which maintains the stability of the viscosity of the blend. Thus, although polar group-containing additives achieve a suitably low viscosity in the pre-blending stage, it has been observed that some compositions increase in viscosity when stored for prolonged periods. Additives which are effective in controlling this viscosity increase include the long chain hydrocarbons functionalized by reaction with mono- or dicarboxylic acids or anhydrides which are used in the preparation of the ashless dispersants as hereinbefore disclosed.

When lubricating compositions contain one or more of the above-mentioned additives, each additive is typically blended into the base oil in an amount that enables the additive to provide its desired function. Representative effective amounts of such additives, when used in crankcase lubricants, are listed below. All the values listed (with the exception of detergent values since the detergents are used in the form of colloidal dispersants in an oil) are stated as mass percent active ingredient (A.I.).

| ADDITIVE | MASS % (Broad) | MASS % (Preferred) |
|---|---|---|
| Dispersant | 0.1-20 | 1-8 |
| Metal Detergents | 0.1-15 | 0.2-9 |
| Corrosion Inhibitor | 0-5 | 0-1.5 |
| Metal dihydrocarbyl dithiophosphate | 0.1-6 | 0.1-4 |
| Antioxidant | 0-5 | 0.01-2.5 |
| Pour Point Depressant | 0.01-5 | 0.01-1.5 |
| Antifoaming Agent | 0-5 | 0.001-0.15 |
| Supplemental Antiwear Agents | 0-1.0 | 0-0.5 |
| Friction Modifier | 0-5 | 0-1.5 |
| Viscosity Modifier | 0.01-10 | 0.25-3 |
| Base stock | Balance | Balance |

Preferably, the Noack volatility of the fully formulated lubricating oil composition (oil of lubricating viscosity plus all additives) is no greater than 18, such as no greater than 14, preferably no greater than 10, mass %. Lubricating oil compositions useful in the practice of the present invention may have an overall sulfated ash content of from 0.5 to 2.0, such as from 0.7 to 1.4, preferably from 0.6 to 1.2, mass %.

It may be desirable, although not essential, to prepare one or more additive concentrates comprising additives (concentrates sometimes being referred to as additive packages) whereby several additives can be added simultaneously to the oil to form the lubricating oil composition.

In a third aspect, the present invention provides a method of reducing the friction between contacting surfaces of a mechanical device, the method comprising lubricating the surfaces with the lubricating composition of the second aspect. Preferably, the mechanical device is a spark-ignited or compression ignited internal combustion engine.

In a fourth aspect, the present invention provides the use of a polymer according to the first aspect as an additive in a lubricating composition to reduce the friction between the contacting surfaces of a mechanical device which is lubricated by the composition. Preferably the lubricating composition is a lubricating oil composition. Preferably, the mechanical device is a spark-ignited or compression ignited internal combustion engine.

EXAMPLES

Synthesis of Polyacrylate Polymers According to the Invention

The Table below details polymers according to the present invention. All were made by the method described below using the reactants listed in the Table. Examples 1 and 2 employed Stages 1, 2 and 3 whereas Example 3 omitted Stage 2 as only one monomer was used. With reference to the first aspect of the present invention, Example 3 is a polymer according to embodiment (a), i.e. where each {Q} is an identical polymer block; and Examples 1 and 2 are polymers according to embodiment (b), i.e. where each {Q} contains a plurality of polymer blocks.

Stage 1

Monomer 1, ethylene glycol-derived bisinitiator [see below *] (1.00 equiv.), tris(2-dimethylaminoethyl)amine ($Me_6$TREN) (0.36 equiv.), $CuBr_2$ (0.10 equiv.) and DMSO (50% v/v) were charged to a Schlenk tube and sealed with a rubber septum. After degassing the reaction mixture for 30 minutes, a stirring bar wrapped with pre-activated copper wire (5 cm) was added to the reaction mixture in a counter-current of nitrogen. The tube was sealed again and the reaction mixture stirred at 25° C. until full conversion was observed (between 4 and 12 hours). Conversion was measured by 1H NMR spectroscopy and SEC analysis was carried out with samples diluted in THF which were filtered over basic alumina prior to analysis to remove residual copper species.

Stage 2

Monomer 2 in DMSO (50% v/v) and another portion of tris(2-dimethylaminoethyl)amine ($Me_6$TREN) (0.36 equiv.) and $CuBr_2$ (0.10 equiv.) were added into a glass vial and degassed for 30 minutes before transferring to the reaction mixture from Stage 1. The tube was sealed again and the reaction mixture stirred at 25° C. until full conversion was observed.

Stage 3

After full monomer conversion, a solution of bisthiol (1.00 equiv.) and triethylamine in DMF was added at ambient temperature to the reaction mixture. The mixture was then stirred overnight at room temperature before SEC analysis was carried out. The crude product was purified by filtration over basic alumina followed by precipitation from cold methanol to provide the pure polymer as a yellowish oil. The polymer obtained was characterised by 1H NMR and GPC with RI and SUV detectors.

The structures of the polymers obtained are given below the Table.

In each case, the ethylene glycol derived bisinitiator was the following compound:

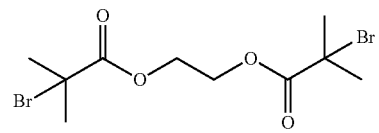

|  | Monomer 1 | Monomer 2 | bisthiol | Mn (g/mol) | Đ |
|---|---|---|---|---|---|
| Example 1 | PEG | EH | 4,4'-thiodibenzenethiol | 55900 | 2.42 |
| Example 2 | PEG | EH | 4,4'-thiodibenzenethiol | 74800 | 2.57 |
| Example 3 | EH | — | 1,3,4-thiadiazole-2,5-dithiol | 15800 | 1.92 |

PEG: polyethylene glycol acrylate (Mn of polyethylene glycol group = 480 g/mol)
EH: 2-ethylhexyl acrylate Structure of Example 1

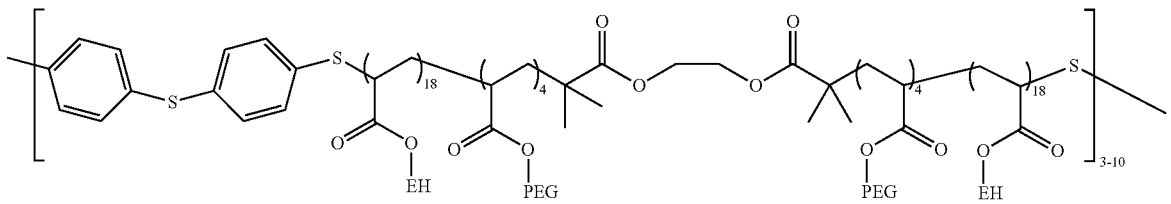

-continued

Structure of Example 2

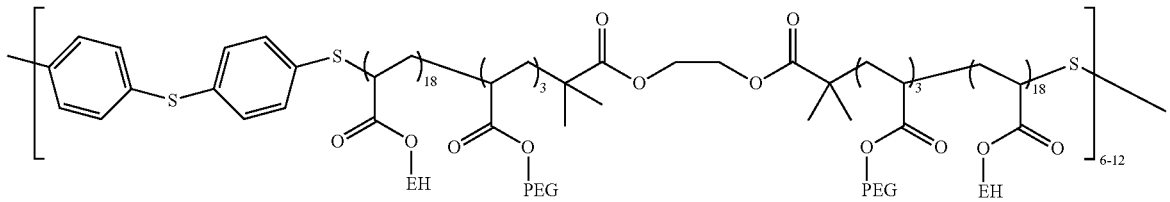

Structure of Example 3

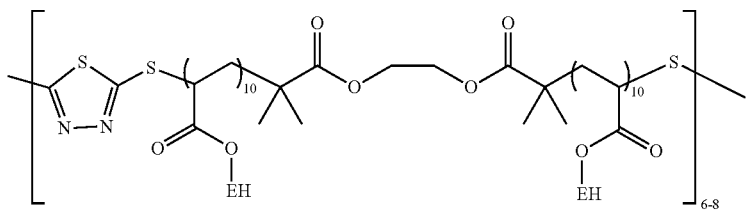

Friction Measurements for Lubricating Oils Containing Polymers According to the Invention.

Each of the polymers of Examples 1, 2 and 3 were added to a Group I base oil in an amount of 1% by weight, based on the weight of the oil. The traction coefficient was measured using an MTM bench test at an oil temperature of 135° C. and a rolling speed of 20 mm/second. Results are given in the table below together with the result of an experiment run using the base oil alone.

| Polymer | Traction coefficient |
|---|---|
| None (base oil only) | 0.0804 |
| Example 1 | 0.0348 |
| Example 2 | 0.0370 |
| Example 3 | 0.0362 |

It is clear from the results that the polymers of the invention provided a significant decrease in traction coefficient compared to the base oil alone. This reduction in friction indicates that there was less contact between the metal surfaces during the test such that the oils containing the polymers may be expected to provide wear protection to the surfaces of a machine lubricated by the oils, for example in an engine.

The invention claimed is:

1. A polymer having the structure (I):

(I)

wherein L is a linking group, R is a hydrocarbon group or a substituted-hydrocarbon group, and x is 2 or more; and wherein each {Q} contains a plurality of polymer blocks, each polymer block being composed of 3 or more monomer units, such that the moiety {Q}-L-{Q} has the structure {$P_n \ldots P_2P_1$}-L-{$P_1P_2 \ldots P_n$} where each $P_n$ is an individual polymer block, the number of polymer blocks n in each {Q} being the same; wherein for each value of n the polymer blocks are identical; and wherein n is an integer of 2 or more, and wherein each polymer block is a homopolymer block and has the structure (II):

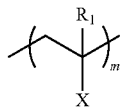

(II)

wherein m is an integer of at least 3; wherein $R_1$ is hydrogen or methyl; wherein X is a hydrocarbon group having from 1 to 50 carbon atoms, a substituted-hydrocarbon group having from 1 to 50 carbon atoms, $COOR_2$, $COSR_2$ or $CONR_2R_3$, $OCOR_2$, $CONHR_2$, CN, $COSiR_2R_3 R_4$ or Cl wherein $R_2$, $R_3$ and $R_4$ are independently hydrogen, a hydrocarbon group having from 1 to 50 carbon atoms, or a substituted-hydrocarbon group having from 1 to 50 carbon atoms; and wherein in each block having structure (II), each $R_1$ and each X and each m may be the same or different across polymer blocks.

2. A polymer according to claim 1, wherein each X is $COOR_2$,
where each $R_2$ is a straight-chain or branched alkyl group.

3. A polymer according to claim 1, wherein each X is $COOR_2$, where each $R_2$ is a polyalkylene glycol residue of the formula —$[(CR_5H)_yO]_zOR_6$, where y is an integer from 2 to 4, and z is from 2 to 100, $R_5$ is hydrogen or an alkyl, and $R_6$ is hydrogen, an alkyl group or an aryl group.

4. A polymer according to claim 1, wherein each {Q} is composed of a plurality of copolymer blocks of structure (II) such that the moiety {Q} {Q} has the structure (III):

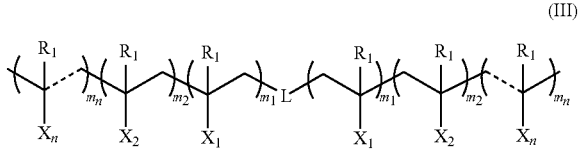

(III)

wherein each $m_1, m_2 \ldots m_n$ is independently an integer of at least 3 and wherein each $X_1, X_2 \ldots X_n$ is independently a hydrocarbon group having from 1 to 50 carbon atoms, a substituted-hydrocarbon group having from 1 to 50 carbon atoms, $COOR_2$, $COSR_2$ or $CONR_2R_3$, $OCOR_2$, $CONHR_2$, CN, $COSiR_2$, $R_3R_4$ or Cl wherein $R_2$ and $R_3$, and $R_4$ are independently hydrogen, a hydrocarbon group having from 1 to 50 carbon atoms, or a substituted-hydrocarbon group having from 1 to 50 carbon atoms.

5. A polymer according to claim 4, wherein each $X_1, X_2 \ldots X_n$ COOR$_2$, where in each instance a, $R_2$ is a straight-chain or branched alkyl group.

6. A polymer according to claim 4, wherein each $X_1, X_2 \ldots X_n$ is COOR$_2$, where in each instance n, each $R_2$ is a polyalkylene glycol residue of the formula —[(CR$_5$H)$_y$O]$_z$OR$_6$, where y is an integer from 2 to 4, and z is from 2 to 100, $R_5$ is hydrogen or an alkyl group and $R_6$ is hydrogen, an alkyl group or an aryl group.

7. A polymer according to claim 4, wherein each $X_1, X_2 \ldots X_n$ is COOR$_2$ and n is at least 2: wherein in at least one instance n, $R_2$, is a straight-chain or branched alkyl group; and wherein in at least one other instance n, $R_2$, is a polyalkylene glycol residue of the formula —[(CR$_5$H)$_y$O]$_z$OR$_6$, where y is an integer from 2 to 4, and z is from 2 to 100, $R_5$ is hydrogen or an alkyl group and $R_6$ is hydrogen, an alkyl group or an aryl group.

8. A polymer according to claim 1, wherein each $R_1$ is hydrogen.

9. A polymer according to claim 4, wherein each $X_1, X_2 \ldots X_n$ is COOR$_2$ and n is 2; wherein in one instance n, $R_2$ is a branched alkyl group and in the other instance n, $R_2$ is a polyalkylene glycol residue of the formula —[(CR$_5$H)$_y$O]$_z$OR$_6$ where y is an integer from 2, to 4, and z is from 2 to 100, $R_5$ is hydrogen or an alkyl group, and $R_6$, is hydrogen, an alkyl group or an aryl group.

10. A polymer according to claim 9, wherein the branched alkyl group is 2 ethylhexyl, and the polyalkylene glycol residue is of the formula —[(CH$_2$)$_y$O]$_z$OMe where y is 2.

11. A polymer according to claim 10, wherein the branched alkyl group is 2-ethylhexyl, and the polyalkylene glycol residue is of the formula —[(CH$_2$)$_y$O]$_z$OMe where y is 2 and z is an average value of 7 to 8.

12. A polymer according to claim 4, wherein each $X_1, X_2 \ldots X_n$ is COOR$_2$ and n is 3; wherein in one instance n, $R_2$ is a branched alkyl group and in the other two instances n, $R_2$ is a polyalkylene glycol residue of the formula —[(CR$_5$H)$_y$O]$_z$OR$_6$ where y is an integer from 2 to 4, and z is from 2 to 100, $R_5$ is hydrogen or an alkyl group, and $R_6$ is hydrogen, an alkyl group or an aryl group.

13. A polymer according to claim 12, wherein the branched alkyl group is 2 ethylhexyl and each polyalkylene glycol residue is the same and of the formula —[(CH$_2$)$_y$O]$_z$OMe where y is 2.

14. A polymer according to claim 13, whereto the branched alkyl group is 2-ethylhexyl, and each polyalkylene glycol residue is the same and of the formula —[(CH$_2$)$_y$O]$_z$OMe where y is 2 and z is an average value of 7 to 8.

15. A polymer according to claim 1, wherein L is the residue of a di-functional initiator molecule which is effective to initiate polymerisation of the monomers used to form the polymer blocks.

16. A polymer according to claim 1, wherein L has the structure:

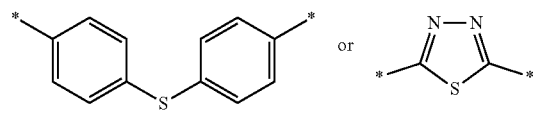

where *indicates the points of attachment to the remainder of the polymer, and where a is an integer from 1 to 100.

17. A polymer according to claim 1, wherein R has the structure:

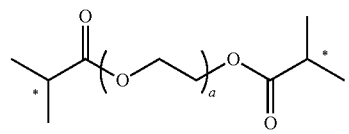

where *indicates the points of attachment to the remainder of the polymer.

18. A lubricating composition comprising a major amount of a base lubricant, and a minor amount of a polymer according to claim 1.

19. A lubricating oil composition comprising a major amount of an oil of lubricating viscosity, a minor amount of a polymer according to claim 1, and a minor amount of one or more of a phosphorus-containing compound, and oxidation inhibitor, a dispersant, a metal detergent, and anti-wear agent, a friction modifier and a viscosity modifier.

20. A method of reducing the friction between contacting surfaces of a mechanical device the method comprising lubricating the surfaces with a lubricating oil composition according to claim 18.

21. A method of reducing the friction between contacting surfaces of a mechanical device, the method comprising lubricating the surfaces with a lubricating oil composition according to claim 19.

22. The method according to claim 21, wherein the mechanical device is a spark-ignited or compression ignited internal combustion engine.

* * * * *

UNITED STATES PATENT AND TRADEMARK OFFICE
CERTIFICATE OF CORRECTION

PATENT NO. : 11,059,924 B2
APPLICATION NO. : 16/575928
DATED : July 13, 2021
INVENTOR(S) : Beatrice N. Cattoz et al.

Page 1 of 1

It is certified that error appears in the above-identified patent and that said Letters Patent is hereby corrected as shown below:

In the Claims

Column 22 In Claim 4, Line 51, delete "{Q} {Q}" and insert therefor --{Q}-L-{Q}--.

Column 23 In Claim 5, Line 5, delete "a" and insert therefor --n--.

Column 23 In Claim 14, Line 48, delete "whereto" and insert therefor --wherein--.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*